United States Patent [19]

Durnford

[11] Patent Number: 5,614,897
[45] Date of Patent: Mar. 25, 1997

[54] AIRCRAFT FLIGHT INSTRUMENT DISPLAYS

[75] Inventor: Simon J. Durnford, Devon, United Kingdom

[73] Assignee: The Secretary of State for Defence in Her Britannic Majesty's Government of the United Kingdom of Great Britain and Northern Ireland, London, England

[21] Appl. No.: 412,874

[22] Filed: Mar. 29, 1995

[51] Int. Cl.$^6$ .................................................. G01C 23/00
[52] U.S. Cl. .......................... 340/973; 340/974; 340/978; 340/979
[58] Field of Search .................... 340/973, 974, 340/975, 980, 971, 977, 978, 979; 73/178 T

[56] References Cited

U.S. PATENT DOCUMENTS

| | | | |
|---|---|---|---|
| 4,247,843 | 1/1981 | Miller et al. | 340/973 |
| 4,419,079 | 12/1983 | Georges et al. | |
| 4,583,094 | 4/1986 | Mosier . | |
| 5,250,947 | 10/1993 | Worden et al. | 340/973 |
| 5,289,185 | 2/1994 | Ramier et al. | 340/973 |
| 5,412,382 | 5/1995 | Leard et al. | 340/973 |
| 5,420,582 | 5/1995 | Kubbat et al. | 340/973 |

FOREIGN PATENT DOCUMENTS

| | | |
|---|---|---|
| 0119723 | 9/1984 | European Pat. Off. . |
| 2202199 | 9/1988 | United Kingdom . |

*Primary Examiner*—Brent A. Swarthout
*Attorney, Agent, or Firm*—Nixon & Vanderhye P.C.

[57] ABSTRACT

An aircraft flight instrument display panel (10) has a combined speed and heading indicator in the form of a central square (11) surrounded by a scaled matrix (12). Displacement of an aircraft (100), in which the display is installed, from a desired speed and heading being indicated by displacement of an aircraft symbol (14) in the y and x directions from the central square. The aircraft (100) has an attitude sensor system (102) and the flight instrument display (108) has a flight instrument control system (104), the attitude sensor system and the flight instrument control system having an interconnection (106) with control laws such that, when the aircraft (100) is displaced from its desired speed and heading, pilot adjustment of pitch and roll, respectively, in a manner tending to return the aircraft (100) to the desired speed and heading, causes the aircraft symbol (14) to move towards the central symmetrical square (11).

18 Claims, 1 Drawing Sheet

AIRCRAFT FLIGHT INSTRUMENT DISPLAYS

BACKGROUND OF THE INVENTION

1. Field of the Invention

The present invention relates to flight instrument displays, particularly such displays for light aircraft and helicopters, and is of particular value in such aircraft having single pilots and no auto-pilot.

2. Discussion of Prior Art

It is well known that aircraft pilots operating without automatic controls require visual references to maintain controlled flight. Under certain conditions, which are commonly met during normal operations, such as in moisture or dust clouds or similar low visibility, the visual reference has to be provided by instruments. Conditions where instruments must be used are known as instrument flight conditions (IFC). Physical or cognitive misconceptions, particularly in instrument flight conditions, may lead a pilot to an incorrect understanding of his aircraft's orientation, a condition known as spatial disorientation (SD). Studies have shown that between 80–100% of aircrew, fixed wing and helicopter, have suffered SD to some degree. Studies have also shown that SD is a cause of many accidents, for example, it has been reported as a major factor in 32% of military helicopter accidents.

It is an important consideration that instrument displays should be easy to read and that readings from various instruments should be easily correlated to give the pilot a true picture of his aircraft's flight path. This is particularly important for conditions where an aircraft suddenly and unexpectedly enters poor visibility and the pilot has to make a rapid transition from visual to instrument flight conditions.

There is a need, therefore, for a simplified instrument display which provides an adequate source of information for standard instrument flight and which also provides an easy source of information for maintenance or re-establishment of a correct flight path on an occurrence of SD.

SUMMARY OF THE INVENTION

According to the present invention, an aircraft flight instrument display includes a display panel having a combined speed and heading indicator in the form of a central symmetrical shape surrounded by a scaled matrix pattern, where the divergence of an aircraft, in which the display is installed, from a desired speed and heading is indicated by displacement of an aircraft symbol is from the central shape.

The aircraft having a flight control system and an attitude sensing system and the instrument display having a display control system, the attitude sensing system and the display control system having an interconnection with control laws such that, when the aircraft is displaced from its desired speed and heading, adjustment of the flight controls so as to pitch and roll the aircraft in a manner tending to return the aircraft to the desired speed and heading causes the aircraft symbol to move towards the central symmetrical shape.

The control laws are such that, when the aircraft has deviated from the desired speed and heading, the position of the aircraft symbol within the central symmetrical shape indicates that the pilot has applied predetermined angles of pitch and roll appropriate to a safe return of the aircraft to the desired speed and heading. The control laws are also preferable such that, as the aircraft speed and heading approach the desired speed and heading, the aircraft symbol moves out of the central symmetrical shape until the angles of bank and pitch are again adjusted to steady the aircraft onto the desired speed and heading with the aircraft symbol within the central symmetrical shape. The control laws may demand a gradual change in aircraft control inputs as the desired speed and heading are approached.

Edges of the pattern may have, adjacent thereto, parameter indicators indicating various flight parameters. The central symmetrical shape may be a square. The scaled matrix will normally be symmetrical, may be a square, and may consist of a pattern of auxiliary symmetrical shapes which may be one or more types of symmetrical shapes such as squares, rectangles, circles, ovals or the like. The parameter indicators will include indicators showing parameters other than those indicated by the square pattern and aircraft symbol, and might also include indicators confirming the parameters indicated by the square pattern and aircraft symbol.

A typical parameter indicator pattern might include, for example, a vertical speed indicator (VSI), an altimeter, an air speed indicator (ASI) and a heading indicator. These might conveniently be positioned with the VSI and altimeter, one on either side of the square pattern, the ASI below the pattern and the heading indicator above the pattern. The VSI and altimeter might be in the form of digital readings of actual and desired aircraft performance in combination with displacement measures in tape form showing displacement of the relevant parameter from that desired.

The display control system will have provision for change of desired flight parameters, any such change being reflected in the control law algorithms applied to the output of the aircraft attitude sensor. Changes in the desired speed and heading will result in the movement of the aircraft symbol out of the central symmetrical shape until appropriate control inputs are made.

The various indicators are preferably color coded. For example, the aircraft symbol, which is preferably a triangle, may be green to indicate that the aircraft is at the correct altitude, red to indicate that the aircraft is low, and blue to indicate that the aircraft is high.

BRIEF DESCRIPTION OF THE DRAWINGS

One embodiment of the invention will now be described, by way of example only, with reference to the accompanying drawings.

DETAILED DESCRIPTION OF PREFERRED EMBODIMENTS

Figure 1:
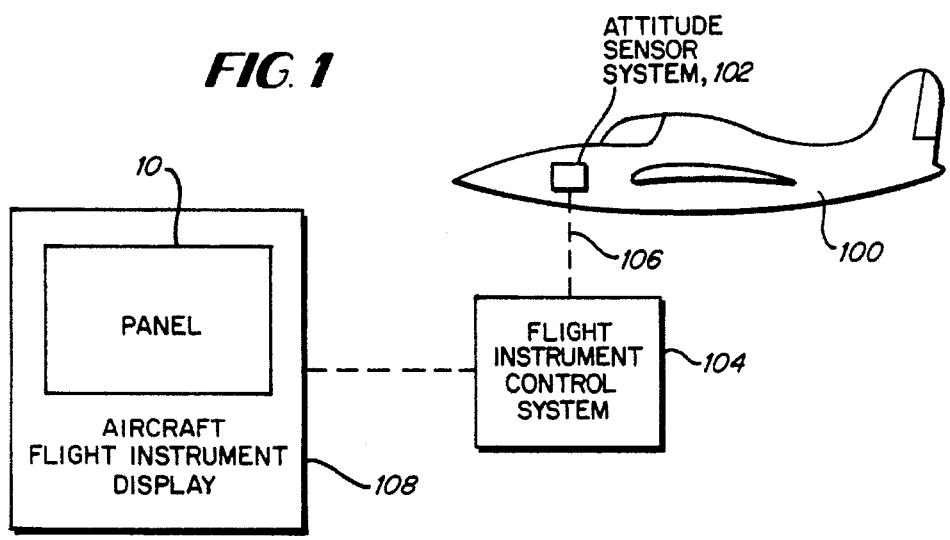
FIG. 1 is a schematic representation of the interrelationship between an aircraft and a display in accordance with the present invention.

As shown in FIG. 1, an aircraft 100 has a flight control system for controlling the aircraft in flight, an aircraft attitude sensor system 102 connected to a flight instrument control system 104 by an interconnection 106. The interconnection 106 could be merely cabling connecting the two systems where the subsequently discussed control laws implemented by the interconnection 106 are actually incorporated into one or both of the systems themselves.

The flight instrument control system 104 controls an aircraft flight instrument display 108 which has a display panel 10 having a central square 11 surrounded by a symmetrical pattern 12, indicated by the broken line, of auxiliary squares 13 (only a portion of which are labeled 13). An aircraft symbol 14, in the form of a triangle, is adapted to be displaced from the central square 11. Displacement of the aircraft symbol in the x-axis is related to both the error between desired and actual headings of an aircraft in which the display is installed and to the aircraft's roll angle. Displacement in the y-axis is related to both the error between desired and actual speeds of the aircraft and to the aircraft's pitch angle. The two factors relevant to each axis act in the opposite direction to each other such that the symbol's displacement will be nil when predetermined pitch and/or roll changes (appropriate to return the aircraft safely to the desired speed and heading) are sensed by the aircraft attitude sensor system 102.

To the left of the pattern 12 is a vertical speed indicator (VSI) 15 having a digital reading 16 of the rate of descent or ascent in conjunction with a strip display 17 of that rate. To the right of the pattern 12 is an altimeter 18 having digital readings of the aircraft's actual altitude 19 and desired altitude 20, and a strip display 21 showing the error between desired and actual altitudes. Below the desired altitude reading 20 is an altimeter pressure setting indicator 28 and above the reading 20 is a glide path selection 29. Above the pattern 12 is a heading indicator 22 having a desired heading 23 and an actual direction indicator (DI) 24. Below the pattern 12 is a digital air speed indicator (ASI) 25 showing actual airspeed.

Auxiliary squares 26, horizontally aligned with central square 11, contain a digital reading of the desired airspeed and auxiliary squares above and below these indicate deviations between the desired and actual airspeeds. Various of the display panel indicators may be color coded. For example, the aircraft symbol 14 might be green when the aircraft is at its correct altitude, red when the aircraft is low and blue when it is high. Similarly, the strip display 17 might be different colors to indicate climbing or descending and the strip display 21 different colors to indicate whether the aircraft is high or low.

The attitude sensor system 102 provides an output indicative of the actual pitch and roll angles of the aircraft. The interconnection 106 to the flight instrument control system 104 is programmed according to appropriate control laws and is connected to the display panel 10, causing the display to indicate the desired flight program and the deviations therefrom.

Figure 2:
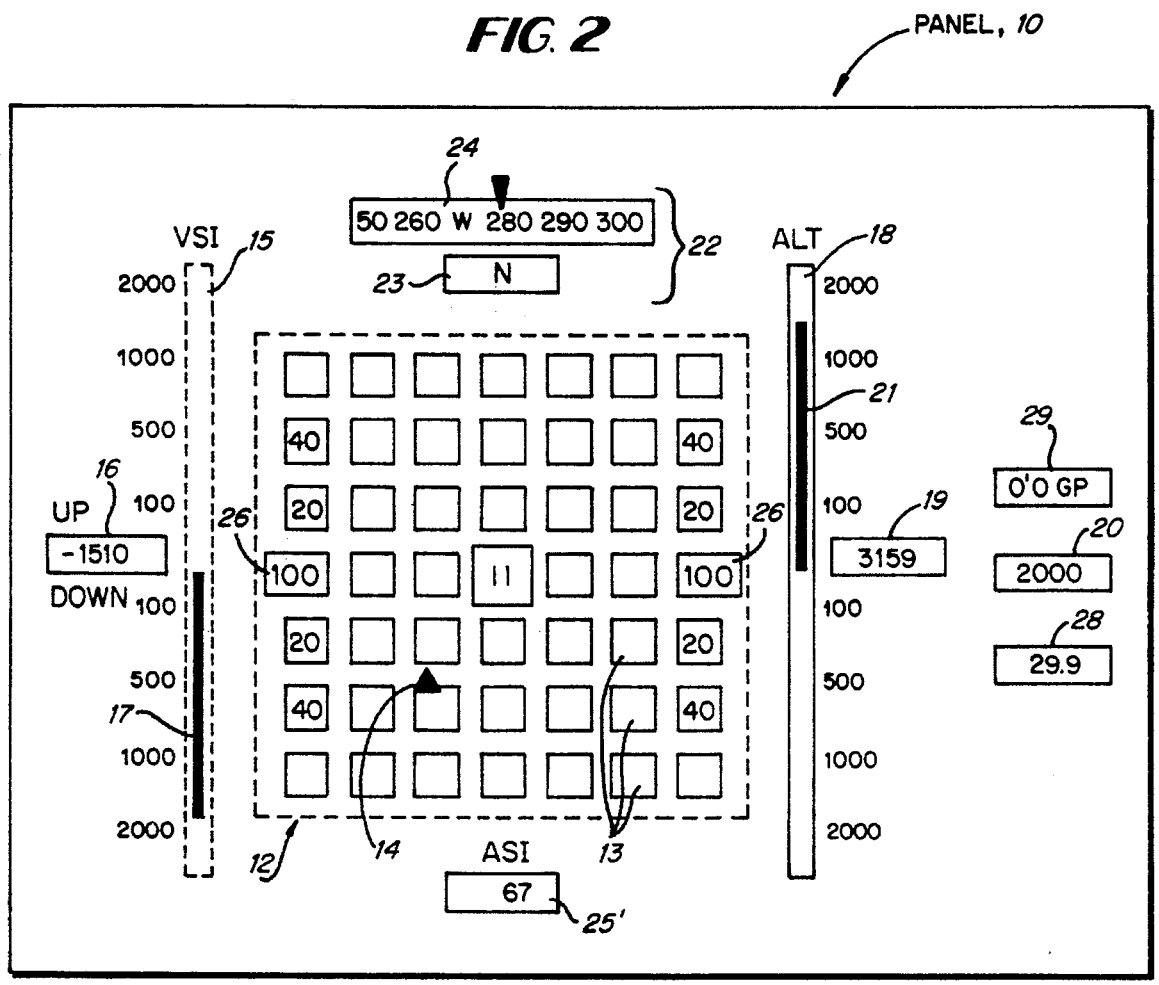
FIG. 2 is a front view of an instrument display in accordance with the present invention.

In the display pattern as shown in FIG. 2, the desired flight program is a speed of 100 knots (see box 26) at a height of 2,000 ft (see box 20) on a heading of 360° (North as in box 23). As can be seen, the actual speed is 67 knots (box 25), the height 3,159 feet (box 19) and the heading 278° (box 24). The displacement of the aircraft symbol 14 from the central square 11 indicates displacement (on the vertical or y axis) from the correct speed and/or the pitch change needed to achieve the correct speed and displacement (on the horizontal or x axis) from the correct heading and/or the roll change needed to achieve the correct heading. Displacement from the correct altitude and from level flight are indicated by the altimeter and VSI displays respectively.

The attitude sensor system 102 determines the aircraft's roll and pitch angles. The control laws programmed into the interconnection are the pitch and roll angles (dependent at least in part upon the speed and heading errors, respectively) necessary to bring the aircraft back to the correct heading and airspeed in a timely fashion (which may be different from the subsequently discussed preferred embodiment, depending upon aircraft type, size, etc.). If the pilot adjusts either roll and/or pitch of the aircraft 100 closer to the programmed necessary roll and pitch changes, the aircraft symbol 14 moves towards the central square 11.

When the correct roll and pitch angles are achieved (as a result of the pilot's inputs to the aircraft control system), the symbol 14 will lie within the square 11. Once the aircraft approaches its correct speed and heading, the symbol 14 previously centered, will start to move out of the square 11 (in the opposite direction) until the existing pitch and roll inputs have been neutralized so as to maintain the aircraft at its desired speed and on its desired heading.

Heading Control

The heading control laws are such that, in a preferred embodiment of the present invention applicable to a utility helicopter, the aircraft symbol moves sideways along the x axis 1 cm for every 20° of heading error (left if the heading error is to the left and right if the heading error is to the right) with a maximum sideways displacement of 1.5 cm (equivalent to a heading error of 30°). However, the aircraft symbol is displaced in the opposite direction 1 cm for every 10° bank, where the bank is in a direction which will reduce the heading error, e.g. if, as disclosed in FIG. 2, the aircraft is to the left of the desired heading, only an appropriate bank to the right will return the aircraft symbol to the central box (and the aircraft back to its proper heading in a timely fashion). There is no limit or cap on the aircraft displacement due to roll and thus, if a roll input is larger than required, the aircraft indicator would actually move to and past the central square 11, inducing the pilot to reduce the bank angle.

Assume that the aircraft is 30° to the left of its desired heading, then the aircraft symbol will be displaced 1.5 cm to the left of the central square along the x axis. Even the disoriented pilot, viewing the display, can input a roll in the direction from the aircraft symbol towards the central square 11, i.e., a roll to the right. Using the above, it will be seen that a 15° roll to the right will move the aircraft symbol 1.5 cm to the right or directly over the central square 11 (because the original location being 1.5 cm to the left due to the heading error has been offset by the 1.5 cm movement to the right due to the roll). At this point the pilot knows that the appropriate amount of roll has been provided even though he may have no ground visibility and may still be disoriented (and thereby prevented from effectively using his normal attitude sensor). While the aircraft is off heading, it has also rolled into a turn which will bring it back to the desired heading.

Assuming that the same 15° bank is maintained, as the heading error decreases (as the aircraft turns towards the desired heading) the aircraft symbol will gradually move to the right of the central square because while the rightward 1.5 cm displacement due to the 15° bank stays constant, the leftward displacement due to heading error is gradually decreasing to 0 cm. Accordingly, the effect on the pilot whose inputs are to try to keep the aircraft symbol centered on the central square, is that, as the aircraft symbol begins to move to the right of the central square, the pilot begins to roll left (the direction from the symbol to the central square) which reduces the bank angle. Ultimately, the pilot rolls out level on the desired heading.

Speed Control

The speed control laws are such that, again in our preferred embodiment of the present invention applicable to a utility helicopter, the aircraft symbol moves vertically along the y axis 1 cm for every 20 knots of speed error (downwards if the speed error is below the desired speed and upwards if the speed error is above the desired speed) with a maximum displacement due to speed error of 1.25 cm i.e., a maximum vertical displacement of 1.25 cm due to a speed error of 25 knots. However, the aircraft symbol is displaced along the y axis, in the direction of the central square 11, 1 cm for every 10° pitch change, where the pitch change is in a direction which will reduce the speed error. For example, as disclosed in FIG. 2, the aircraft is below the desired speed, a 10° pitch down of the nose of the aircraft will aid in the acceleration of the aircraft back to its proper speed. There is no limit or cap on the aircraft symbol displacement due to pitch changes and thus, if a pitch change is larger than that required, the aircraft indicator could actually move up to and past the central square 11, inducing the pilot to reduce the amount of pitch change.

Assume that the aircraft is 30 knots below its desired speed, then the aircraft symbol will be displaced 1.25 cm (the maximum displacement due to speed error is 1.25 cm) below the central square along the y axis. Even the disoriented pilot, viewing the display, can input a pitch change in the direction from the aircraft symbol towards the central square 11, i.e., pushing the aircraft control stick forward. Using the above, it will be seen that a 15° pitch change downwards will move the aircraft symbol 1.5 cm upward and past the central square 11 (because the original location being 1.25 cm below due to the speed error has been offset by the 1.5 cm upward movement due to the nose down pitch change). At this point the pilot knows that more than the appropriate amount of pitch change has been provided and a slight raising of the nose will serve to center the aircraft symbol on the central square 11. While the aircraft is off of its desired speed, it has pitched down so that it will begin to accelerate up to the desired speed.

Just as with the heading correction, as the speed error decreases (as the aircraft speed increases towards the desired speed) the aircraft symbol will gradually move above the central square 11 because while the upward 1.5 cm displacement due to the 10° downwards pitch change stays constant, the downward displacement due to speed error is gradually decreasing to 0 cm (as the speed increases to the desired speed). Accordingly, the effect on the pilot, whose inputs are to try to keep the aircraft symbol centered on the central square, is that, as the aircraft symbol begins to move above the central square, the pilot begins to pitch the aircraft nose up (the direction from the symbol to the central square) which reduces the original downward pitch. Ultimately, the pilot levels off at the desired speed.

In practice, of course, and depending on his skill and experience, a pilot may concentrate first on establishing the correct roll angle and then on the correct pitch angle, or vice versa, or both simultaneously.

It is understood that while portions of the above system have been discussed as separate elements, in practice, many of these elements would ordinarily be combined in a modern aircraft. For example the aircraft attitude sensor system 102 and the flight instrument control system 104 would normally be combined with any necessary control laws, represented by interconnection 106, incorporated therein.

It will be realized, of course, that in view of the above, many variations of the above system are possible within the scope of the present invention and would be obvious to those of ordinary skill in the art. For example, the rates and or angles of pitch and roll correction may be different from those discussed. In the display, other shapes than squares may be substituted for the central and auxiliary squares 11, 12, respectively. Indeed, the auxiliary pattern may be free of any auxiliary shapes.

Further, although the primary benefit of the present invention is with respect to controlling both heading and airspeed, it could be used advantageously to provide information on only a single parameter. Additionally, while heading and speed parameters are used in the above preferred embodiment, any other aircraft control parameter could be displayed and controlled by the present invention. The invention provides a flight instrument display which enables a pilot of an aircraft to concentrate on maintaining or regaining a desired flight path without the need to monitor and respond to his aircraft's attitude sensor when disoriented. Accordingly, the invention is limited only by the following claims.

What is claimed is:

1. An aircraft flight instrument display system for an aircraft, said aircraft having a flight control system for controlling the flight of the aircraft, said aircraft having an actual aircraft speed and heading, an aircraft attitude sensor system and a flight instrument control system for controlling said aircraft flight instrument display system, said aircraft flight instrument display system comprising:

a display panel having an y and x axis, where y is a vertical axis and x is an horizontal axis, said panel including a combined speed and heading indicator in the form of a central shape;

means for inputting a desired speed and heading to said display panel;

said flight instrument control system including means, responsive to said actual aircraft speed and heading, for driving said display panel to indicate any difference between said actual aircraft speed and heading from said desired aircraft speed and heading by means of an y and x displacement, respectively, of an aircraft symbol from the central shape, where movement of a pilot's control stick from a position representative of the aircraft symbol towards a position representative of said central shape will tend to reduce said any difference.

2. An aircraft flight instrument display system in accordance with claim 1, wherein said means for driving said display panel comprises a means, responsive to said attitude sensor system sensing of pitch and roll, for indicating effectiveness of said operator pitch and roll input in reducing said difference by reducing said y and x displacement, respectively.

3. An aircraft flight instrument display system in accordance with claim 2, wherein said means for driving said display panel, responsive to said actual and desired aircraft speed and heading difference approaching zero, further includes means for indicating any additional operator pitch and roll input changes, respectively, necessary for maintaining said desired aircraft speed and heading.

4. An aircraft flight instrument display system as claimed in claim 1, wherein said display panel has a pattern with edges and said edges have, adjacent thereto, parameter indicators indicating various flight parameters.

5. An aircraft flight instrument display system as claimed in claim 1, wherein the central shape is a square.

6. An aircraft flight instrument display system as claimed in claim 1, wherein the central shape is surrounded by a scaled matrix in the form of a symmetrical square.

7. An aircraft flight instrument display system as claimed in claim 6, wherein the symmetrical square contains a number of auxiliary symmetrical shapes.

8. An aircraft flight instrument display system as claimed in claim 7, wherein the auxiliary symmetrical shapes are squares.

9. An aircraft flight instrument display system as claimed in claim 4, wherein said display panel has a pattern and the parameter indicators include indicators showing parameters other than those indicated by the pattern and the aircraft symbol.

10. An aircraft flight instrument display system as claimed in claim 9, wherein the parameter indicators include indicators confirming the parameters indicated by the pattern and the aircraft symbol.

11. An aircraft flight instrument display system as claimed in claim 9, wherein the pattern is symmetrical and has two sides and the parameter indicators include a vertical speed indicator (VSI), an altimeter, an air speed indicator (ASI) and a heading indicator.

12. An aircraft flight instrument display system as claimed in claim 11, wherein the VSI and altimeter are positioned one on either side of the symmetrical pattern, the ASI is positioned below the pattern and the heading indicator is positioned above the pattern.

13. An aircraft flight instrument display system as claimed in claim 12, wherein the altimeter is in the form of digital readings of actual and desired aircraft altitude in combination with a displacement measure in tape form showing displacement of the actual and desired aircraft altitude.

14. An aircraft flight instrument display system as claimed in claim 4, wherein the parameter indicators are color coded.

15. An aircraft flight instrument display system as claimed in claim 14, wherein the aircraft symbol is green to indicate that the aircraft is at a desired altitude, red to indicate that the aircraft is below the desired altitude, and blue to indicate that the aircraft is above the desired altitude.

16. An aircraft flight instrument display system as claimed in claim 1, wherein the aircraft symbol is a triangle.

17. An aircraft flight instrument display system as claimed in claim 1, wherein said aircraft is a helicopter.

18. An aircraft flight instrument display system as claimed in claim 1, wherein said aircraft is a fixed wing aircraft.

* * * * *